(12) United States Patent
de Bonet

(10) Patent No.: US 7,117,506 B2
(45) Date of Patent: Oct. 3, 2006

(54) PLUG-IN API FOR MODULAR NETWORK TRANSACTION PROCESSING

(75) Inventor: Jeremy S. de Bonet, N. Andover, MA (US)

(73) Assignee: MobiTV, Inc., Emeryville, CA (US)

(*) Notice: Subject to any disclaimer, the term of this patent is extended or adjusted under 35 U.S.C. 154(b) by 64 days.

(21) Appl. No.: 10/360,172

(22) Filed: Feb. 7, 2003

(65) Prior Publication Data

US 2003/0187869 A1 Oct. 2, 2003

Related U.S. Application Data

(60) Provisional application No. 60/354,976, filed on Feb. 7, 2002.

(51) Int. Cl.
*G06F 9/00* (2006.01)
(52) U.S. Cl. ..................................... 719/328
(58) Field of Classification Search ................ 719/312, 719/328
See application file for complete search history.

(56) References Cited

U.S. PATENT DOCUMENTS

| | | | |
|---|---|---|---|
| 5,497,434 A | | 3/1996 | Wilson |
| 5,805,777 A | * | 9/1998 | Kuchta .................. 358/1.13 |
| 5,825,917 A | | 10/1998 | Suzuki |
| 5,903,728 A | * | 5/1999 | Semenzato ................ 709/217 |
| 6,005,979 A | | 12/1999 | Chang et al. |
| 6,006,279 A | * | 12/1999 | Hayes ..................... 719/328 |
| 6,009,192 A | | 12/1999 | Klassen et al. |
| 6,216,112 B1 | * | 4/2001 | Fuller et al. ................ 705/14 |
| 6,671,728 B1 | * | 12/2003 | Mayberry .................. 709/227 |

FOREIGN PATENT DOCUMENTS

EP 0 807 883 A2 11/1997

OTHER PUBLICATIONS

International Search Report for PCT/US02/28994 Dec. 4, 2002.
Robert W. Floyd & Louis Steinberg, "*An adaptive algorithm for spatial gray scale*" SID 75 Digest: 36-37, 1975.
Paul Heckbert, "*Color image quantization for frame buffer display*" Computer Graphics, 16(3):297-307, Jul. 1982.
C. E. Shannon, "*A mathematical theory of communication*" The Bell System Technical Journal, 27(3):379-423, Jul. 1948.
C. E. Shannon, "*A mathematical theory of communication, Part III.*" The Bell System Technical Journal, pp. 623-656, Jul. 1948.
T. A. Welch, "*A technique for high-performance data compression*" Computer, 17(6): 8-19, Jun. 1984.

(Continued)

*Primary Examiner*—William Thomson
*Assistant Examiner*—LeChi Truong
(74) *Attorney, Agent, or Firm*—Sprinkle IP Law Group

(57) ABSTRACT

Systems and methods for processing network transactions by breaking down the transactions into several stages and performing the processing corresponding to each stage using a different plug-in module. One embodiment of the invention comprises an application programming interface (API) that enables the use of individual plug-in modules to perform different stages of the processing of a transaction. The API defines a series of interfaces to corresponding plug-in processing modules, where each interface corresponds to a stage of processing of a transaction and the API conveys transaction information from one plug-in module to the next, until all of the processing stages have been completed. The API may be embodied in a network transaction processing application that is adaptable to different functionalities and different protocols by plugging different modules into the interface provided by the API.

23 Claims, 11 Drawing Sheets

OTHER PUBLICATIONS

Jacob Ziv, "*Coding theorems for individual sequences*" IEEE Transactions on Information Theory, 24(4): 405-412, Jul. 1978.

Jacob Ziv & Abraham Lempel, "*A universal algorithm for sequential data compression*" IEEE Transactions on Information Theory, 24(3): 337-343, May 1977.

Jacob Ziv & Abraham Lempel, "*Compression of individual sequences via variable-rate coding*" IEEE Transactions on Information Theory, 24(5): 530-536, Sep. 1978.

International Search Report in Related PCT/US03/03611.

Dragoi et al., "The Conceptual Architecture of the Apache Web Server", Online.

"Struts User's Guide", Online.

"Mapping Protocol Requests to Uniform Resource Locators", IBM Technical Disclosure Bulletin, IBM Corp. New York, 39(5), pp. 149-150.

Thau, R., Design Considerations for the Apache Server API, 28(11), pp. 1113-1122.

* cited by examiner

PLUG-IN API FOR MODULAR NETWORK TRANSACTION PROCESSING

RELATED APPLICATIONS

This application claims priority to U.S. Provisional Patent Application No. 60/354,976, entitled "A Plug-In API For Modular Network Transaction Processing," by Jeremy S. de Bonet, filed Feb. 7, 2002 which is hereby fully incorporated by reference herein. Additionally, U.S. Provisional Patent Application No. 60/349,344, entitled "Modular Plug-In Transaction Processing Architecture" by de Bonet et al., filed Jan. 18, 2002 and U.S. Provisional Patent Application No. 60/349,424, entitled "Network Proxy Platform that Simultaneously Supports Data Transformation, Storage, and Manipulation for Multiple Protocols" by de Bonet et al., filed on Jan. 18, 2002, U.S. patent application Ser. No. 10/342,113, entitled "Method and System of Performing Transactions Using Shared Resources and Different Applications," by de Bonet et al., filed Jan. 14, 2003 are incorporated by reference herein.

BACKGROUND

1. Field of the Invention

The invention relates generally to computer and software architectures, and more particularly to systems and methods for constructing network transaction processing platforms that comprise plug-in modules which control the manner in which transactions between a client and a server are processed.

2. Related Art

A vast majority of the computer systems that are currently in use are not configured strictly as stand-alone devices. In other words, they are coupled to other computers, and possibly other types of devices, through one or more networks. For example, it is typical for a personal computer set up for use at a person's home or business to be connected to other computers (e.g., web servers) via the Internet. Communications between networked computers can be handled in many different ways. For example, a single computer can run multiple network programs at the same time, and each program can use any communication protocol (or protocols) that chooses. The only restriction on these programs is that only one program can bind to a specific TCP or UDP port at a time. Thus, only one program can listen for requests on any given port (e.g., port 80, which is the standard port for HTTP), but a second program (e.g., an FTP server or even another Web server) running at the same time can only listen for requests on a different port.

Just as a particular program can use different protocols, a particular program can perform one or many tasks. For example, a program can perform the tasks of a content server, a content proxy, a caching proxy, a transformation proxy, an advertisement insertion proxy, a content optimization server or proxy, and so on.

Even though it is possible for programs to perform multiple tasks, prior art programs for handling network communications have typically been designed to perform a single task per program. Prior art programs that perform multiple tasks are actually quite rare. In some instances, prior art programs act as dispatchers to other programs that perform different tasks. For example, a Web server can be configured to dispatch received requests to different programs (e.g., CGI's), depending upon the actual URL that is requested.

Prior art programs therefore present a number of difficulties in designing a system that performs multiple tasks. For example, because prior art programs are typically designed to perform a single task, chaining these single tasks with others often involves rewriting most or all of the corresponding programs. Further, because different programs are typically used to perform different tasks (e.g., as in the foregoing example of the Web server that dispatches requests to other programs), there is little or no sharing of functionality between these programs. Thus, each program may have to independently provide such functionality as caching, logging, configuration, authorization, monitoring, communications, and so on.

SUMMARY OF THE INVENTION

One or more of the problems outlined above may be solved by the various embodiments of the invention. Broadly speaking, the invention comprises systems and methods for processing network transactions by breaking down the transactions into several stages and performing the processing corresponding to each stage using a different plug-in module.

One embodiment of the invention comprises an application programming interface (API) that enables the use of individual plug-in modules to perform different stages of the processing of a transaction. The API defines a series of interfaces to corresponding plug-in processing modules, where each interface corresponds to a stage of processing of a transaction and the API conveys transaction information from one plug-in module to the next, until all of the processing stages have been completed.

The API may be implemented, for example, in a server application that is designed to process network transactions. In one embodiment, transactions are broken down into seven stages: initializing the transaction; sending an opening statement; getting a request; logging in and obtaining authorization; generating a response; sending the response; and terminating the transaction. A set of plug-in modules, each one corresponding to one of the stages, is provided to handle the processing for each of the stages. The plug-in modules use the API to pass transaction information from one module to the next and to thereby completely process the transaction. Depending upon the type of communication that is being carried on between two parties, different sets of plug-in modules can be installed to provide the needed processing, whether it be different functionality, or different protocols.

The software application and/or API described above are embodied in a computer-readable medium such as a floppy disk, hard disk drive, CD-ROM, DVD-ROM, RAM, ROM, DASD array, magnetic tape, optical storage device and the like. It should be noted that the computer readable medium may comprise a RAM or other memory which forms part of a computer system. The computer system would thereby be enabled to perform a method in accordance with the present disclosure and is believed to be within the scope of the appended claims.

Numerous additional embodiments are also possible.

The various embodiments of the invention may provide a number of advantages over prior art systems and methods. For example, because many modules can run within the same program, a single port can be shared by different modules and thereby different tasks can be performed on requests to a single port. Further, the present architecture supports listening to multiple ports, each with the same or different protocols and module dispatching rules. Further, rather than dispatching requests to completely new programs, the present method allows for dynamically selecting different series of modules to process the transaction, making possible substantial overlap and reuse of functionality. Still further, changing the tasks performed by a program can be achieved by writing new modules or simply by rearranging or recombining preexisting modules. Still further, modules within the program may access common resources and make calls to functions provided by other modules (e.g., caching, logging, configuration, authorization, monitoring, communications, etc.). Thus, for example, different caching modules (which might have slightly different behaviors) can store and retrieve their content from the same cache—thus maximizing the chances of achieving a cache hit.

Further, by creating a system that breaks down network transactions into a series of stages, and by processing each of the stages in a modular fashion, the number of protocols supported by the system may be rapidly increased. The modular processing of the stages may also increase the ability of the system to adjust and modify the functionality that is provided in the processing of the transactions (e.g., adding new tasks). The use of the API may therefore provide greater control and flexibility over the various stages of transaction processing. Still further, by extending the API to include plug-in functionality, new modules can be created by parties other than the producer of the server application and plugged into the system without the need to expose source code.

BRIEF DESCRIPTION OF THE DRAWINGS

Other objects and advantages of the invention may become apparent upon reading the following detailed description and upon reference to the accompanying drawings.

Figure 1:
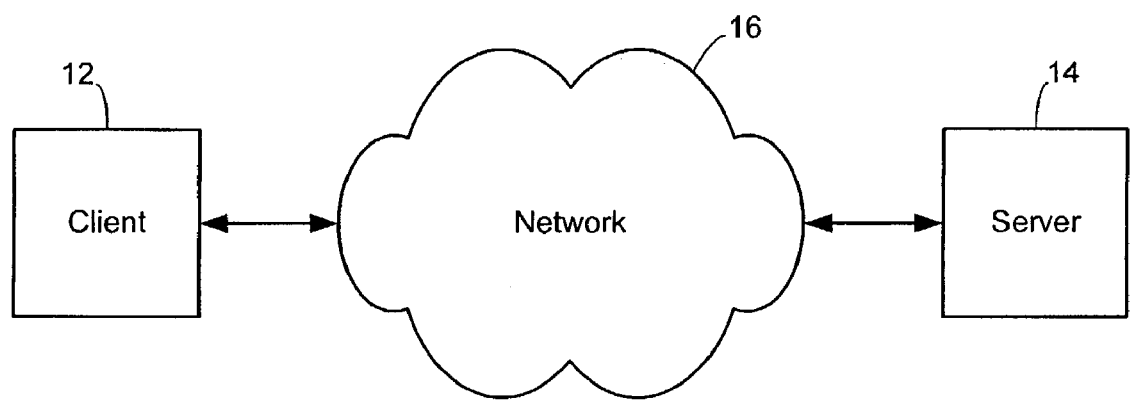
FIG. 1 is a diagram illustrating some of the basic components of a network system in one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION

One or more preferred embodiments of the invention are described below. It should be noted that these and any other embodiments described below are exemplary and are intended to be illustrative of the invention rather than limiting.

Broadly speaking, the invention comprises systems and methods for processing transactions in a server by breaking down the transaction into several stages and performing the processing corresponding to each stage using a different plug-in module that is interfaced with the server application.

One embodiment of the invention comprises an application programming interface (API) that enables the use of individual plug-in modules to perform different stages of the processing of a transaction. The API may be implemented, for example, in a server application that is designed to process network transactions. In one embodiment, transactions are broken down into seven stages: initializing the transaction; sending an opening statement; getting a request; logging in and obtaining authorization; generating a response; sending the response; and terminating the transaction. A set of plug-in modules, each one corresponding to one of the stages, is provided to handle the processing for each of the stages. The plug-in modules use the API to pass transaction information from one module to the next and to thereby completely process the transaction. Depending upon the type of communication that is being carried on between two parties, different sets of plug-in modules can be installed to provide the needed processing, whether it be different functionality, or different protocols.

The various embodiments of the invention may provide a number of advantages over prior art systems and methods. For example, by creating a system that breaks down network transactions into a series of stages, and by processing each of the stages in a modular fashion, the number of protocols supported by the system can be rapidly increased. The modular processing of the stages also increases the ability of the system to adjust and modify the communication that takes place within the processing of the transactions. The use of the API therefore provides greater control and flexibility over the various stages of transaction processing. Still further, by extending the API to include plug-in functionality, new modules can be created by parties other than the producer of the server application and plugged into the system without the need to expose source code.

It should be noted that, while the description of the various embodiments contained in this disclosure focus on communications between a client and a server, other embodiments of the invention may concern communications between any two parties. There need not be a client-server relationship between them. Thus, embodiments of the invention may be designed to handle processing of a facsimile communications between one facsimile machine and another, voice-over-IP communications between a cellular phone and a computer, or any other type of network communications.

One embodiment of the invention is implemented in a network environment. Referring to FIG. 1, a diagram illustrating some of the basic components of a network system is shown. As depicted in this figure, the system comprises a client 12 and a server 14, each of which is interconnected to a network 16. Server 14 is configured to provide information responsive to requests from client 12 (i.e., to service the requests).

The communications between client 12 and server 14 comprise network transactions. In a typical transaction, client 12 generates a request and transmits the request via network 16 to server 14. Upon receiving the request, server 14 processes the request and generates a response to the request. For example, server 14 may retrieve a web page that was requested by client 12. This response is then transmitted from server 14 to client 12 via network 16.

It should be noted that the network configuration illustrated in FIG. 1 is intended to be exemplary rather than limiting. Other embodiments may employ alternative configurations. For example, there may be multiple clients and multiple servers that are interconnected by multiple individual networks. Alternatively, a client may be directly coupled to a server without an intervening network. Many such variations are possible.

Communications between client 12 and server 14 can be accomplished using electronic, optical, radio-frequency, or other signals. For example, client 12 may convert signals received from server 14 to a human understandable form and may convert input from a human understandable form to appropriate electronic, optical, radio-frequency, or other signals to be used by server 14. Similarly, when an operator is at server 14, server 14 may convert the signals to a human understandable form when sending a communication to the operator and may convert input from a human understandable form to appropriate electronic, optical, radio-frequency, or other signals to be used by client 12.

Figure 2:
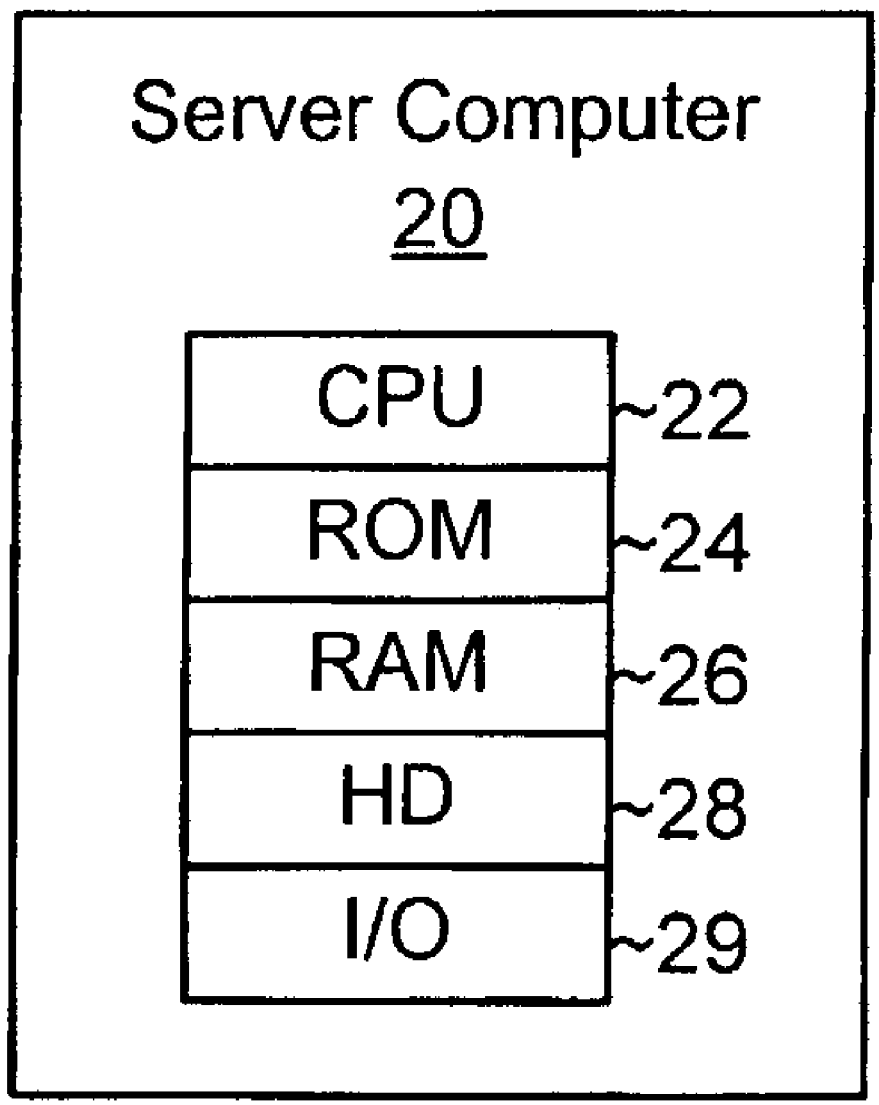
FIG. 2 is a diagram illustrating the components of an exemplary computer system in one embodiment.

In one embodiment, each of client 12 and server 14 is implemented in a corresponding computer system. These computer systems may comprise general purpose desktop computers, laptop computers, or other types of devices capable of communicating over network 16 and processing the information communicated between them. Referring to FIG. 2, a diagram illustrating the components of an exemplary computer system is shown. The computer system illustrated in this figure may be used as a platform for either client 12 or server 14.

As shown in FIG. 2, computer system 20 comprises a central processing unit ("CPU") 22, read-only memory ("ROM") 24, random access memory ("RAM") 26, hard disk drive ("HD") or storage memory 28, and input/output device(s) ("I/O") 29. I/O 29 can include a keyboard, monitor, printer, electronic pointing device (e.g., mouse, trackball, stylus, etc.), or the like.

The computer systems that provide platforms for the client and server may each have more than one CPU, ROM, RAM, HD, I/O, or other hardware components. For simplicity, the computer illustrated in FIG. 2 is depicted in as having one of each of the listed hardware components. It should be noted that FIG. 2 is a simplification of an exemplary hardware configuration. Many other alternative hardware configurations are possible and known to persons of skill in the art.

"Computer" and "computer system," as used herein, are intended to include any type of data processing system capable of performing the functions described herein. "Computer-readable media," as used herein, refers to any medium that can store program instructions that can be executed by a computer, and includes floppy disks, hard disk drives, CD-ROMs, DVD-ROMs, RAM, ROM, DASD arrays, magnetic tapes, floppy diskettes, optical storage devices and the like.

As explained above, the different protocols that can be supported and functionalities that can be provided by different servers may result from the use of different software applications. The support of different protocols and functionalities is facilitated in the present embodiment by running a modular software application on the server computer. More particularly, the software application uses an API that enables individual plug-in modules to be used to perform different stages of the processing of network transactions.

Figure 3:
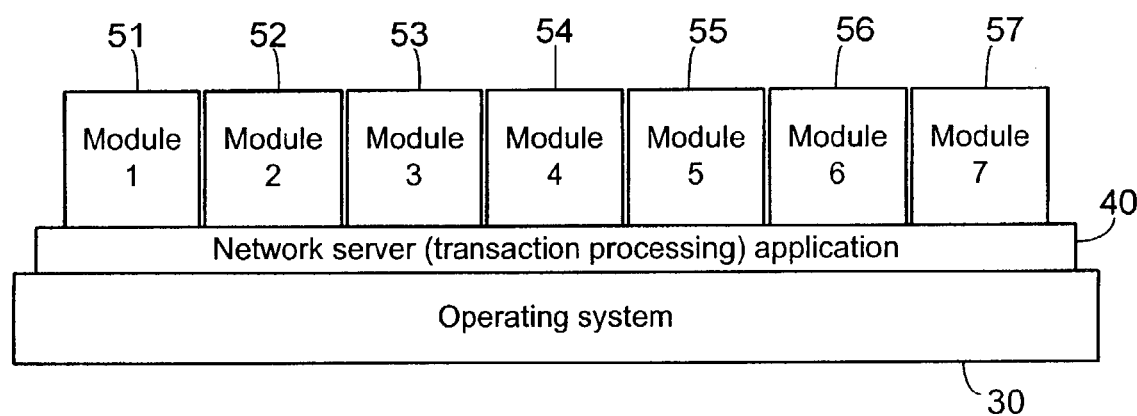
FIG. 3 is a diagram illustrating the modular structure of a server application in accordance with one embodiment.

Referring to FIG. 3, a diagram illustrating the structure of a server application in accordance with one embodiment is shown. As shown in the figure, a network server application 40 runs on top of the operating system 30 of the server computer. Network server application 40 interfaces with a plurality of plug-in modules 51–57 which perform the processing of transactions handled by the server. Server application 40 interfaces with plug-in modules 51–57 via an API (not shown in FIG. 3) that defines the interface with each module. Plug-in modules 51–57 correspond to the seven stages of the transaction processing identified above (initializing the transaction; sending an opening statement; getting a request; logging in and obtaining authorization; generating a response; sending the response; and terminating the transaction). These stages will be described in more detail below.

Figure 4:
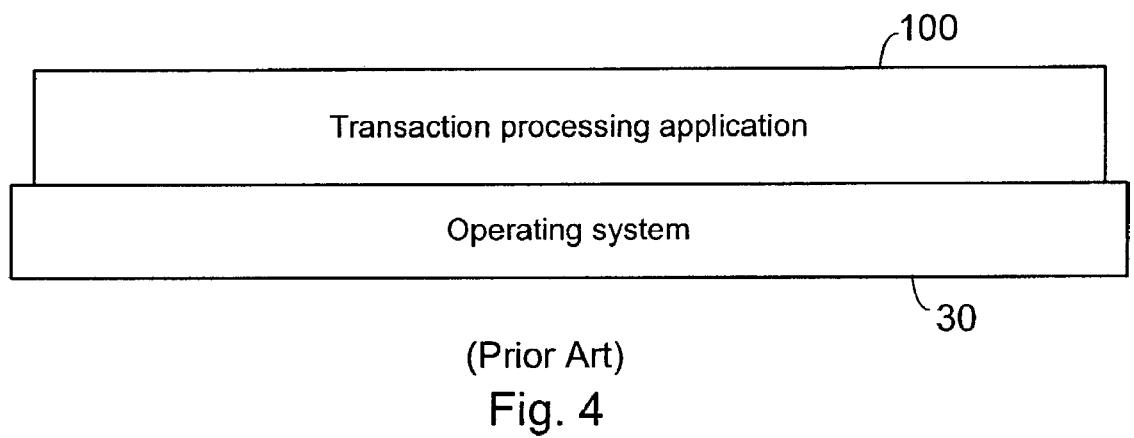
FIG. 4 is a diagram illustrating the structure of a server application in accordance with the prior art.

The structure of the present application as illustrated in FIG. 3 stands in stark contrast to the typical structure of prior art applications, which are represented by the structure illustrated in FIG. 4. As shown in this figure, rather than using plug-in modules to perform the transaction processing, prior art applications employed a single application 100 running on the operating system 30 to provide the necessary processing. If it was necessary to change the processing (e.g., modifying the functionality or supported protocols), the entire application had to be rewritten or replaced. Using the present methodologies, the same changes can be made by replacing one or more of the plug-in modules (51–57), which requires substantially fewer resources.

Figure 5:
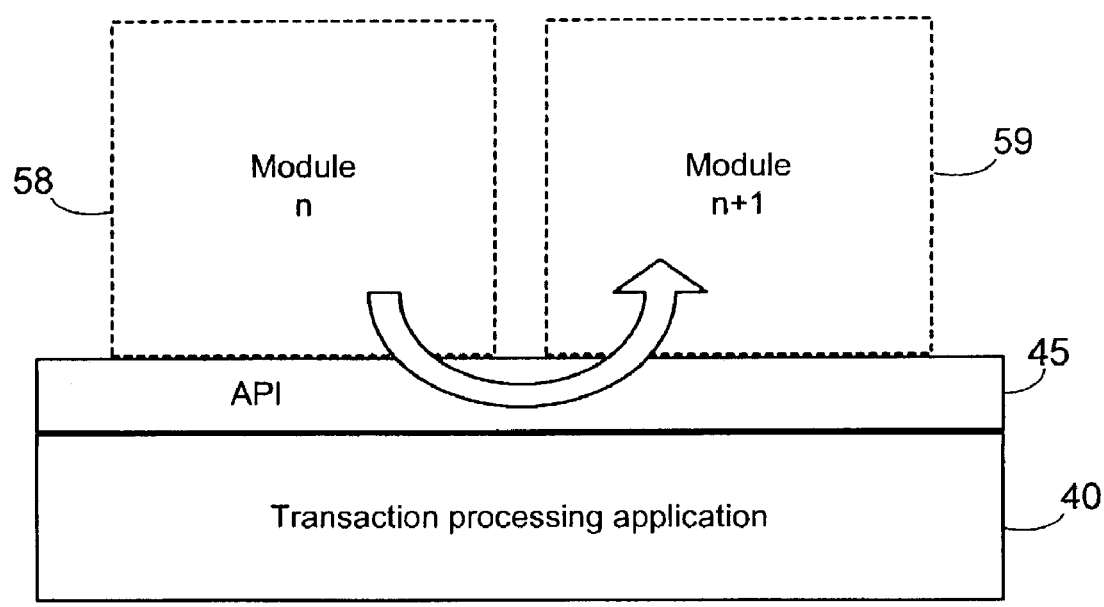
FIG. 5 is a diagram illustrating the flow of data from one plug-in module to the next in the processing of a network transaction in accordance with one embodiment.

Referring to FIG. 5, a diagram illustrating the flow of data from one plug-in module to the next in the processing of a network transaction is shown. FIG. 5 corresponds to the structure of FIG. 3, but includes only a portion of the structure. As depicted in this figure, plug-in modules 58 and 59 interface with server application 40 via API 45. Each of modules 58 and 59 performs the processing for a corresponding portion of the total processing for the transaction (i.e., each performs the processing for a corresponding stage). It should be noted that the plug-in modules in this figure are referenced by numbers 58 and 59, rather than any of 51–57 because FIG. 5 is representative of any pair of consecutive modules in the group 51–57. Thus, for example, modules 58 and 59 may correspond to modules 51 and 52, modules 52 and 53, modules 53 and 54, and so on.

Plug-in module 58 receives any transaction information it requires and begins performing its stage of processing for the transaction. If module 58 corresponds to module 51, it receives this information from the client via the network. Otherwise, module 58 receives the necessary transaction information from the preceding plug-in module via API 45. When module 58 completes its stage of the processing, the resulting transaction information is conveyed to plug-in module 59 via API 45. Plug-in module 59 then performs its stage of the processing. If there are modules subsequent to module 59, the resulting transaction information is conveyed to the subsequent module via API 45. If module 59 corresponds to module 57 of FIG. 3, processing of the transaction is complete, and the results are conveyed to the client via the network.

The flow of processing described above corresponds to a single transaction processing pathway. A single program may instantiate multiple pathways that use different combinations of modules to perform the necessary processing. A single pathway may perform one or multiple tasks. The processing associated with each pathway will be performed in generally the same manner as described above, using the modules called upon instantiation of that pathway. It should be noted that different pathways may call the same modules and thereby reuse the same program code.

Figure 6:
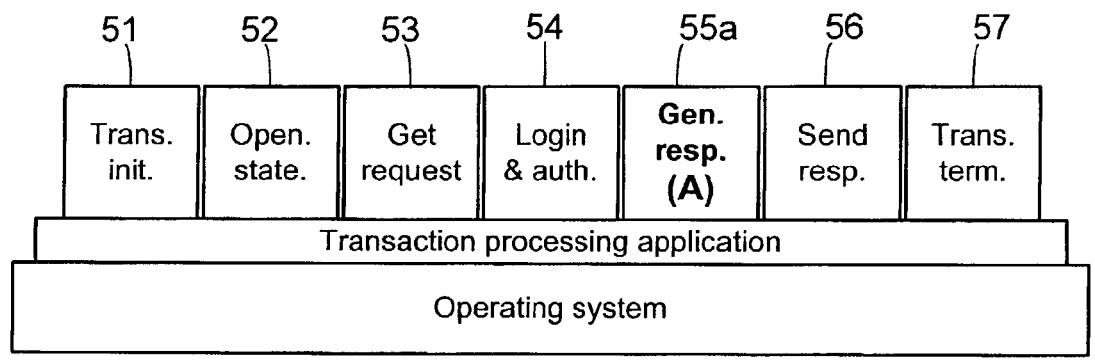
FIG. 6 is a diagram illustrating the replacement of a plug-in module to the transaction processing application in accordance with one embodiment.
Figure 6:
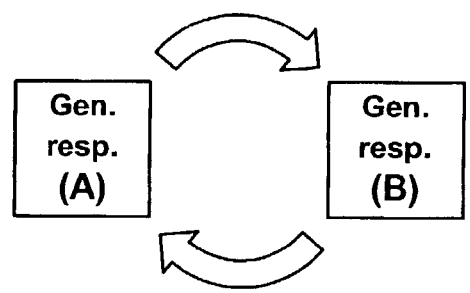
Figure 6:
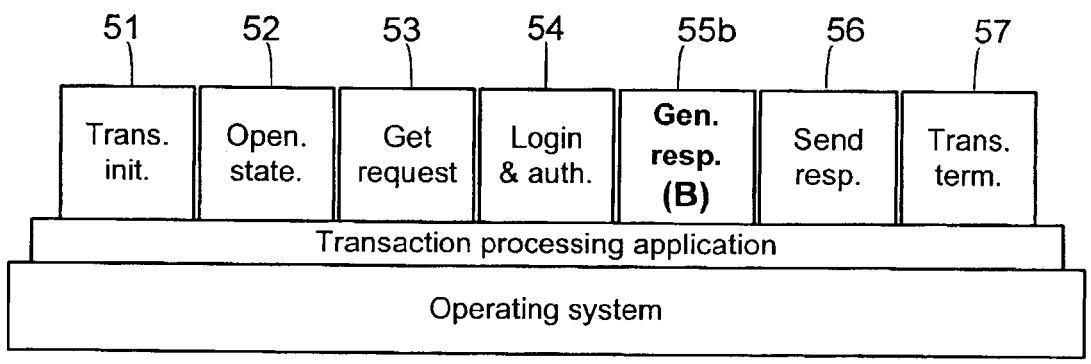

Referring to FIG. 6, a diagram illustrating the replacement of a plug-in module to the transaction processing application is shown. In this example, the application is first configured with plug-in modules 51–54, 55*a*, 56 and 57. Module 55*a* corresponds to the generation of a response to a request. In order to modify the manner in which a response to the request is generated, it is only necessary to provide a new plug-in module, 55*b*, that provides the desired functionality and to replace the original module, 55*a*, with the new module, 55*b*.

Figure 7:
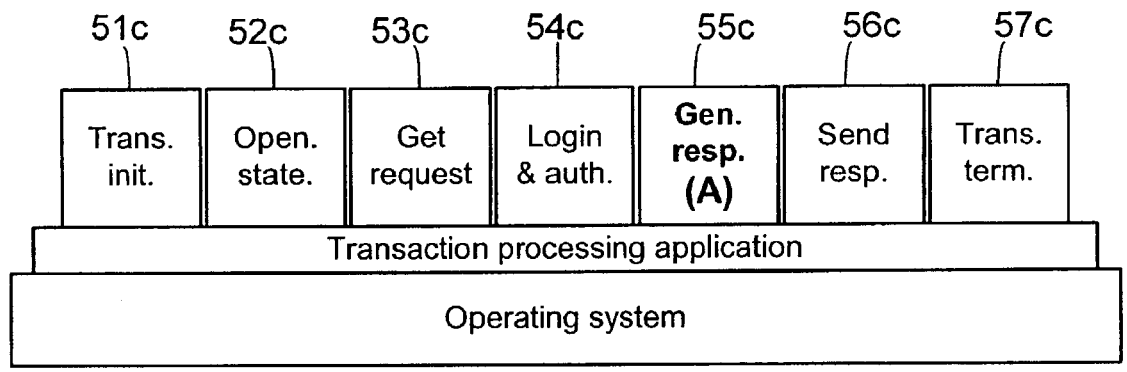
FIG. 7 is a diagram illustrating the replacement of multiple plug-in modules to the transaction processing application in accordance with one embodiment.
Figure 7:
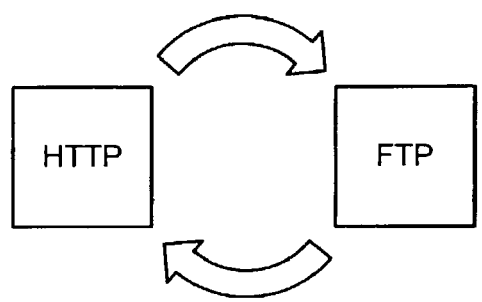
Figure 7:
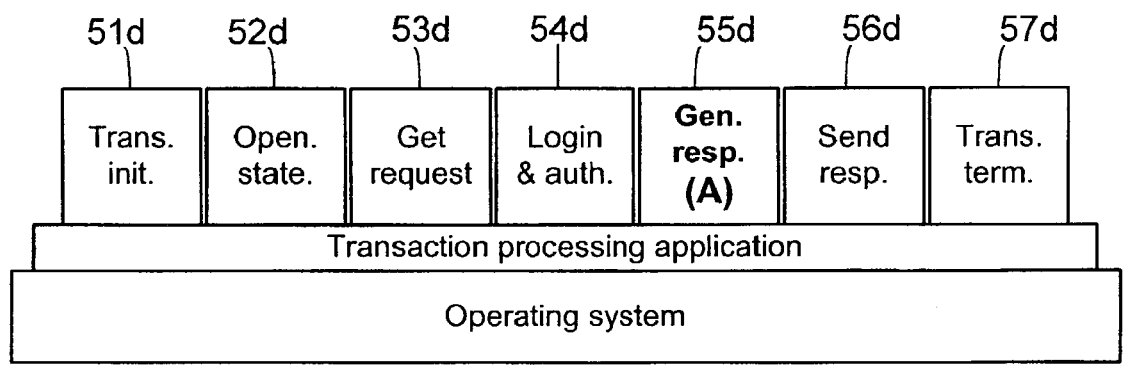

Referring to FIG. 7, an alternative module-replacement scenario is illustrated. In this figure, the transaction processing application is initially configured to process HTTP transactions. If it is desired to handle transactions using other protocols, this can be accomplished by replacing the HTTP modules (51*c*–57*c*) with modules (51*d*–57*d*) supporting the alternative protocol (e.g., FTP). It should be noted that, although the illustration of FIG. 7 depicts the replacement of all seven plug-in modules, it may be possible to accomplish the same purpose through replacement of fewer modules the same processing is performed in a particular stage, independent of the protocol change. It should also be noted that the replacement of modules may be accomplished dynamically (i.e., while the application is executing) by making the modules available and simply instantiating a communication pathway using calls to the modules that are appropriate for the pathway (this will be addressed in more detail below).

Portions of the methods described herein may be implemented in suitable software code that may reside within ROM 24, RAM 26, hard disk drives 28 or other computer-readable media within the system. The software code may also be contained on a separable data storage device, such as a removable hard disk, or on removable computer-readable media such as a DASD array, magnetic tape, floppy diskette, optical storage device, or the like. In one embodiment, the software code may comprise lines of compiled $C^{++}$, Java, or other language code.

The various software components may reside on a single computer or on any combination of separate computers. Other configurations may also be used. For example, the functions of server 14 may be implemented in multiple computers that interact to perform the functions of the server. Additionally, a computer program or its software components within such code may be embodied in more than one computer-readable medium. Similarly, components of the software may reside on multiple computers.

Figure 8:
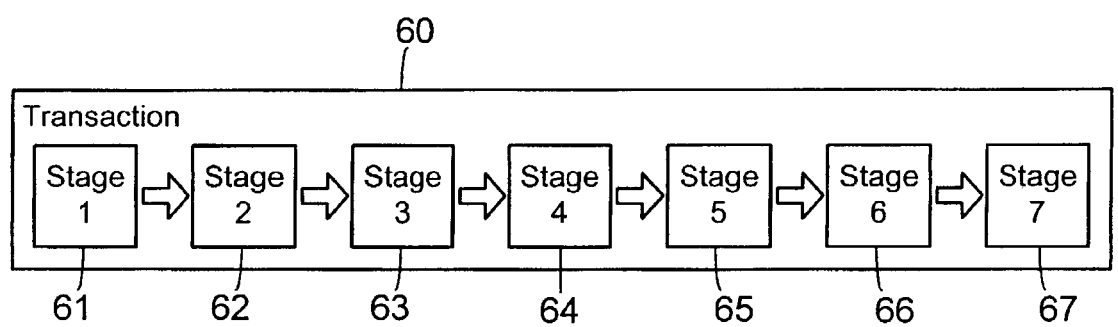
FIG. 8 is a diagram illustrating the processing of a network transaction using the server application of FIG. 3.
Figure 9:
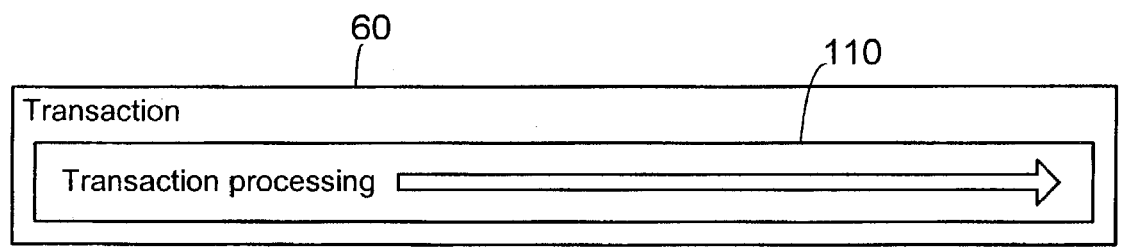
FIG. 9 is a diagram illustrating the processing of a network transaction using the prior art server application of FIG. 4.

Referring to FIG. 8, a diagram illustrating the processing of a network transaction using the server application of FIG. 3 is shown. In this figure, the processing of the transaction is depicted as block 60. The processing within block 60 is broken down into seven stages represented by blocks 61–67. Block 61 corresponds to the processing that is performed by plug-in module 51 (i.e., initialization of the transaction), while block 62 corresponds to the processing of plug-in module 52 (i.e., sending an opening statement), and so on. Upon completion of all of the individual stages, processing of the transaction is completed. Again, this processing contrasts the prior art, in which the transaction processing was not segregated into stages, but was instead combined into one block (see item 110 of FIG. 9) so that even minor changes required the application as a whole to be rewritten or replaced.

In the embodiments described above, the processing of the network transactions is broken down into the seven stages of: initializing the transaction; sending an opening statement; getting a request; logging in and obtaining authorization; generating a response; sending the response; and terminating the transaction. These stages are used because processing for every network transaction includes these stages, although the sending of an opening statement may be optional. The processing of a network transaction will be described below to illustrate the functions of each of the stages.

In one embodiment, the processing of the network transactions is based upon the notion of a transaction processing pathway. A pathway is a type of communication that may be employed to carry on communications between the client and a server. For example, the client and server may set up a pathway for HTTP communications, POP communications, MMS communications, SMS communications, instant messaging, file transfers (via FTP), or the like. There may be several pathways set up between the client and server, each one for a different type of communications.

Figure 10:
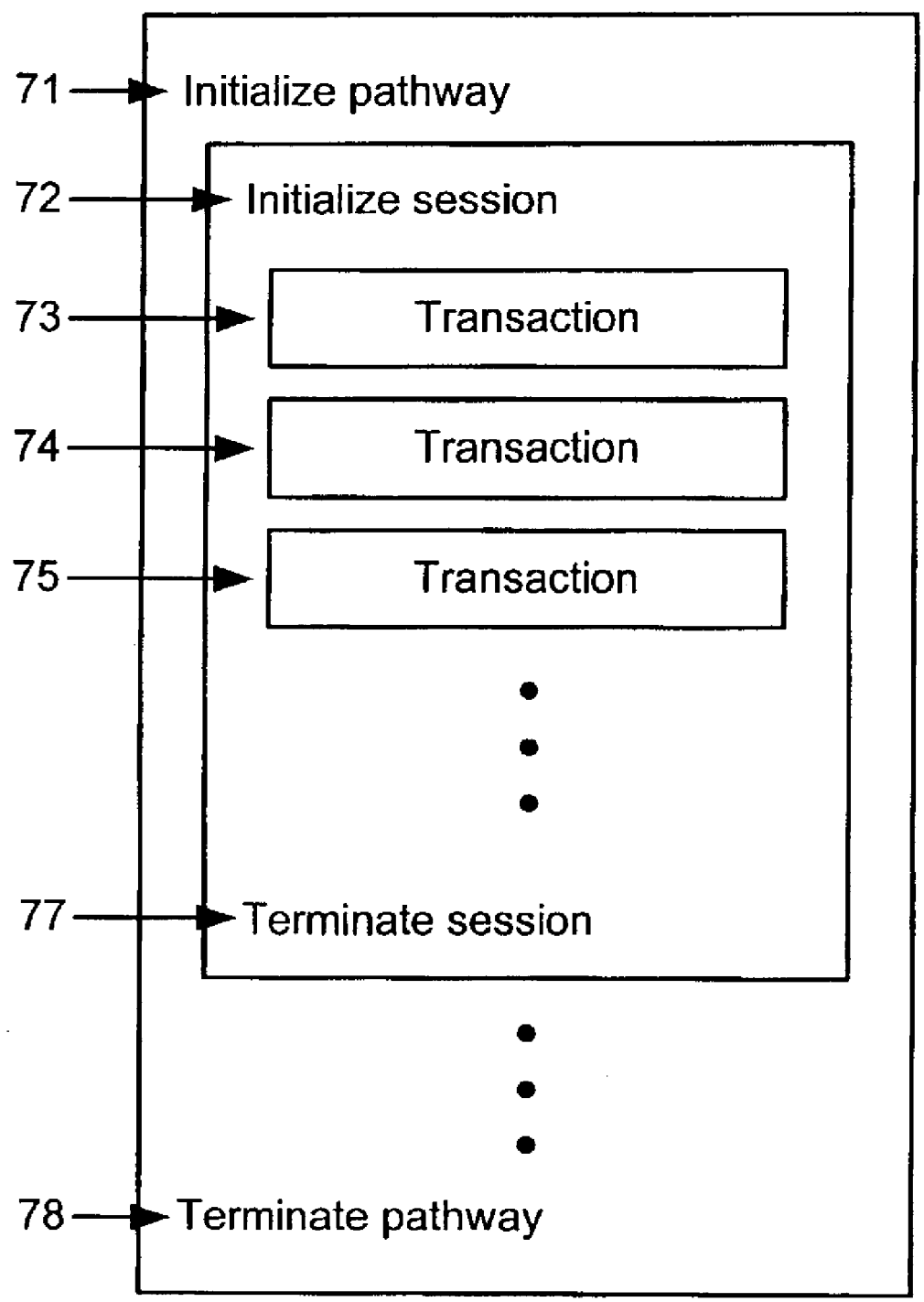
FIG. 10 is a diagram illustrating the initialization and termination of pathways and sessions, and the processing of transactions within a session in one embodiment.

The client and server use a particular pathway for communications of a corresponding type. A series of communications between the client and server using this pathway comprise a session. Each individual communication between the client and server (e.g., a request for a web page and the resulting service of that page) is a transaction. Thus, in a simple example (illustrated in FIG. 10), a client and server may communicate by: initializing a pathway (71); initializing a session (72); processing a set of transactions (73–76); terminating the session (77); and then terminating the pathway (78).

Figure 11:
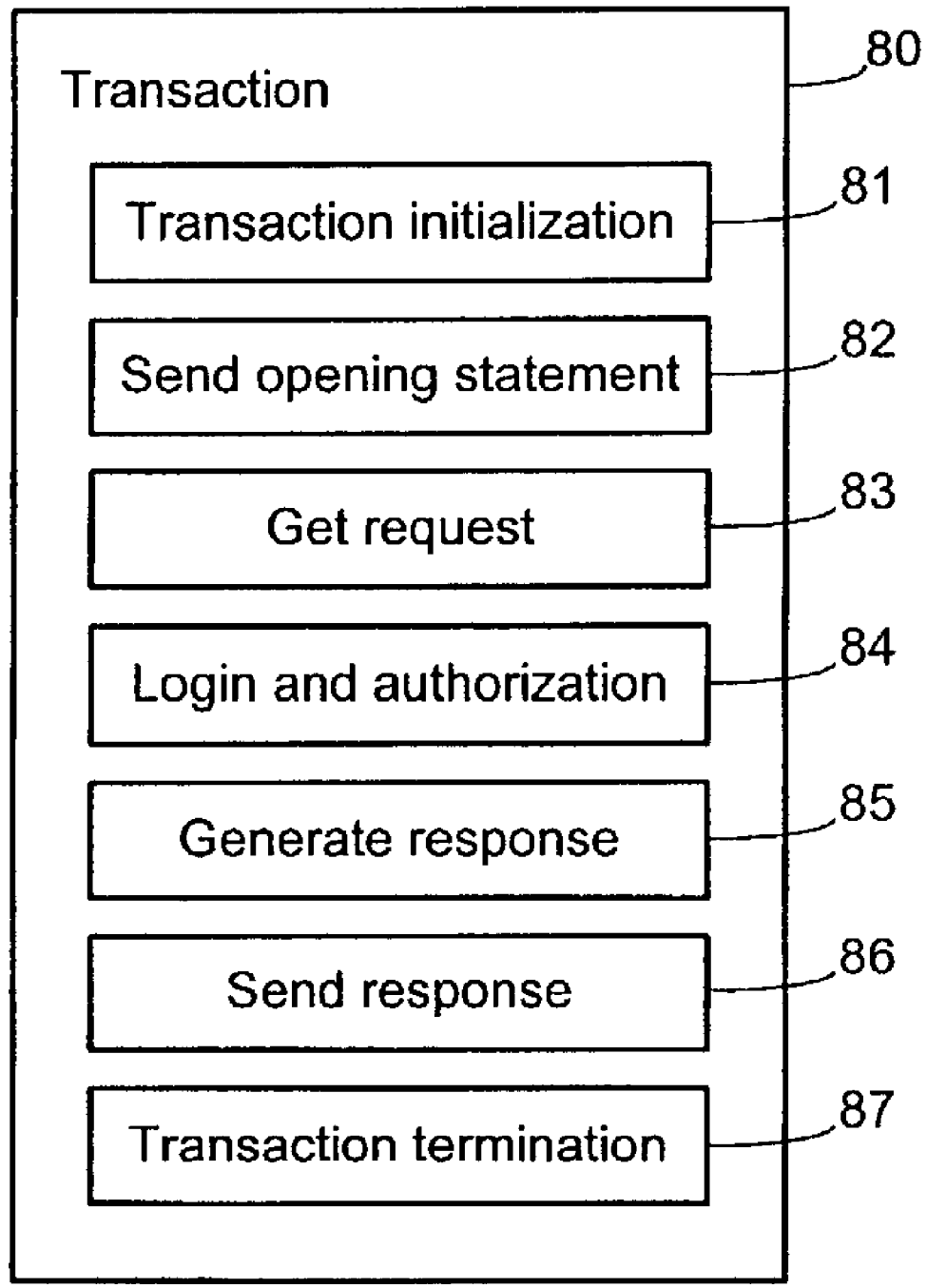
FIG. 11 is a diagram illustrating the initialization and termination of pathways and sessions, and the processing of transactions within a session in one embodiment.

Just as there may be multiple sessions within a pathway and multiple transactions within a session, there are multiple stages within the processing of each transaction. The stages of the transaction processing in one embodiment are illustrated in FIG. 11. As shown in this figure, the overall processing of the transaction (80) consists of transaction initialization (81), sending an opening statement (82), getting a request from the client (83), logging in and obtaining authorization (84), generating a response (85), sending the response to the client (86) and terminating the transaction (87). As described above, these processing stages are implemented in one embodiment using individual plug-in modules that interface with the server application via an API. The API can be defined as described below.

During initialization of the pathway, pathway parameters can be set up. An example is shown below. A preferred way of setting up the parameters is to use the method described in "System And Method For Program Configuration" (U.S. patent application Ser. No. 10/345,084, filed Jan. 15, 2003), which is incorporated by reference as if set forth herein in its entirety). Other suitable methods could be used, however. Additionally, as with all stages, log information can be generated.

```
i. typedef bool (*Pathway_Initialization)
ii. (
    1. const Parameters &pathway_parameters,
    2. Log &pathway_log
iii. );
```

Each new connection is considered a session. When a new connection is established, the step of session initialization occurs. An example is shown below. During this stage, parameters for the session are set up. Session parameters can make use of the pathway parameters, for example, to set up default or systemwide values. Session parameters exist only for the duration of the current session, and are unique to the current session (i.e. multiple concurrent sessions each have their own session parameters)

```
i. typedef bool (*Session_Initialization)
ii. (
    1. Parameters &session_parameters,
    2. const Parameters &pathway_parameters,
    3. Log &session_log,
    4. const Log &pathway_log
    5. Connection &connection
iii. );
```

Each session comprises a series of transactions. During initialization of a new transaction, transaction parameters are set up. An example of the API definition for this stage is shown below. Like session parameters, transaction parameters exist only for a single transaction.

```
i. typedef bool (*Transaction_Initialization)
ii. (
    1. Parameters &transaction_parameters,
    2. const Parameters &session_parameters,
    3. const Parameters &pathway_parameters,
    4. Log &transaction_log,
    5. const Log &session_log,
    6. int number_of_transactions
iii. );
```

Depending on the communication protocol, each transaction can begin with zero, one or a series of messages being sent from the system to the client. An example of the API definition for this stage is shown below. This stage may not be required in some types of transactions.

```
i. typedef bool (*Send_Opening_Message)
ii. (
    1. Parameters &transaction_parameters,
    2. const Parameters &session_parameters,
    3. const Parameters &pathway_parameters,
    4. Log &transaction_log,
    5. Connection &connection
iii. );
```

Next, a request is received from the client. An example of the API definition for this stage is shown below. Depending on the nature of the communication protocol, a request optionally comprises a request header and/or a request buffer.

```
i. typedef bool (*Get_Request)
ii. (
    1. Parameters &transaction_parameters,
    2. const Parameters &session_parameters,
    3. const Parameters &pathway_parameters,
    4. Header &request_header,
    5. Buffer &request_buffer
    6. Log &transaction_log,
    7. Connection &connection
iii. );
```

In the next stage of processing, authorization of the request is performed. An example of the API definition for this stage is shown below. Authorization can be based on many different factors, including user ID, client IP address, account information, system usage information, etc.

```
i. typedef bool (*Authorization)
ii. (
    1. Parameters &transaction_parameters,
    2. const Parameters &session_parameters,
    3. const Parameters &pathway_parameters,
    4. Request &request,
    5. Log &transaction_log
iii. );
```

In the next stage of processing, the request is analyzed and a response is generated. An example of the API definition for this stage is shown below. In the case where the system is acting as a proxy, a secondary request may be generated to some other content server and that response can be optionally manipulated and put in place of the response header and buffer.

```
i. typedef bool (*Generate_Response)
ii. (
    1. Parameters &transaction_parameters,
    2. const Parameters &session_parameters,
    3. const Parameters &pathway_parameters,
    4. const Header &request_header,
    5. const Buffer &request_buffer
    6. Header &response_header,
    7. Buffer &response_buffer
    8. Log &transaction_log
iii. );
```

It should be noted that the Generate_Response stage is the point at which the processing performed by a proxy typically differs from that of a server. In the case of a server, the information responsive to the client request is generated locally. In the case of the proxy, the proxy attempts to locally generate the information responsive to the request (e.g., by retrieving the information from a cache). If the proxy cannot provide the responsive information itself, the proxy forwards the request on behalf of the client to a server, which returns the responsive information to the proxy. In other words, the proxy either generates the requested information by itself, or it obtains the information from a server.

One or many modules can be used to issue requests to servers on behalf of the client (see the http_make_request_to_server module in the multi-task example below). A whole fleet of such modules, e.g.: pop_make_request_to_server, nntp_make_request_to_server, https_make_request_to_server, ftp_make_request_to_server, etc. Cross-protocol applications can be easily created by just plugging in a different make_request_to_server module. For example, HTTP requests can be converted to POP so that the web can be used to access email attachments. Further, many requests to servers could be made in response to receiving a single client request. For example, a proxy could: speed up the download of information by requesting information simultaneously from multiple servers, or could combine information from multiple different requests to the same server.

Finally, the response is sent to the client. An example of the API definition for this stage is shown below.

```
i. typedef bool (*Send_Response)
ii. (
    1. Parameters &transaction_parameters,
    2. const Parameters &session_parameters,
    3. const Parameters &pathway_parameters,
    4. ResponseHeader &responseHeader,
    5. ResponseBuffer &responsebuffer
    6. Log &transaction_log,
    7. Connection &connection
iii. );
```

At the end of a transaction, a cleanup function can be called which can generate logs, free allocated resources etc. An example of the API definition for this stage is shown below.

```
i. typedef bool (*Transaction_Termination)
ii. (
    1. Parameters &transaction_parameters,
    2. const Parameters &session_parameters,
    3. const Parameters &pathway_parameters,
    4. Log &transaction_log,
    5. Connection &connection
iii. );
```

At the end of a session, the connection is closed and a cleanup function can be called which can generate logs, free allocated resources, etc. An example is shown below.

```
i. typedef bool (*Session_Termination)
ii. (
    1. const Parameters &session_parameters,
    2. const Parameters &pathway_parameters,
    3. Log &session_log,
    4. Connection &connection
iii. );
```

When the system is shut down, or a soft restart is required, the pathway is terminated. A cleanup function can be called at these times to generate logs, free allocated resources, etc.

```
i. typedef bool (*Pathway_Termination)
ii. (
    1. const Parameters &pathway_parameters,
    2. Log &pathway_log
iii. );
```

If any of the functions for the stages return a false value, the transaction and session can be immediately terminated, and the connection closed. In the case of a false response from the Pathway_* functions, the pathway can be terminated, and connections will not be made or accepted.

A new pathway can be created by calling an installation function. During the use of this pathway, each of the specified functions is called for the corresponding stage of processing (e.g., setting up the pathway and its sessions, and processing the transactions).

```
i. bool Install_New_Pathway(
    1. const Pathway_Initialization pathway_initialization,
    2. const Session_Initialization session_initialization,
    3. const Transaction_Initialization transaction_initialization,
    4. const Send_Opening_Message send_opening_message,
    5. const Get_Request get_request,
    6. const Authorization authorization,
    7. const Generate_Response generate_response,
    8. const Send_Response send_response,
    9. const Transaction_Termination transaction_termination,
    10. const Session_Termination session_termination,
    11. const Pathway_Termination pathway_termination
ii. );
```

Many simpler installation functions can be created on top of the general function set forth above by allowing the function caller to only specify functions for some of the pathway stages. Default functions are inserted for the non-specified stages. An example of this would be the function below, which allows for the creation of an HTTP module that can generate requests on the fly.

```
i. bool Install_SimpleHTTPResonse_Pathway(
    1. const Generate_Response generate_response,
ii. )
iii. {
iv. return Install_New_Pathway(
    1. General_HTTP_Pathway_Initialization,
    2. General_HTTP_Session_Initialization,
    3. General_HTTP_Transaction_Initialization,
    4. General_HTTP_Send_Opening_Message,
    5. General_HTTP_Get_Request,
    6. General_HTTP_Authorization,
    7. generate_response,
    8. General_HTTP_Send_Response,
    9. General_HTTP_Transaction_Termination,
    10. General_HTTP_Session_Termination,
    11. General_HTTP_Pathway_Termination
v. );
vi. }
```

By decomposing the transaction processing system into these modular stages, e.g. using the API specified here, the creation of new pathways to support different functionality and protocols becomes substantially easier than was the case for the methods of the prior art.

It should be noted that the pathways described above perform a single task. That is, they process each transaction in the same manner. As noted above, a pathway may alternatively be configured to perform multiple tasks. Thus, rather than dispatching requests to completely different programs, a pathway can be configured to dynamically select different series of modules to process a particular transaction. There can be substantial overlap and reuse of functionality between the different series of modules. An example which might perform one of several tasks in a web proxy is shown below.

```
i.  Send_Opening_Message  ==> [do_nothing_module]
ii. Get_Request            ==> [get_http_request_module]
```

```
            -continued iii. Authorization         ==> [http_proxy_authorization]
    iv. if (task is caching proxy){
        1. Generate_Response  ==> [http_check_cache]
b. [http_make_request_to_server]
c. [http_add_to_cache]
    i. }
    ii. else if (task is transformation proxy){
        1. Generate_Response  ==>
            [http_make_request_to_server]
d. [optimize_content]
    i. }
    ii. else if (task is pass-thru proxy){
        1. Generate_Response  ==>
            [http_make_request_to_server]
    iii. }
    iv. else if (task is web server){
        1. Generate_Response  ==> [get_file_off_disk]
    v. }
    vi. Send_Response          ==> [http_send_response]
    vii. Transaction_Termination  ==> [do_nothing_module]
```

In this example, "<stage>==> [modules]" means that the identified transaction stage (<stage>) is associated with the list of modules ([modules]) following the arrows (==>). It can be seen in this example that most of the modules are shared across all tasks (e.g. get_http_request_module is used by all), while other modules (e.g. http_make_request_to_server) used only for certain ones of the tasks.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A software program product executable by a central processing unit (CPU) of a computer system, the software program product being embodied in a computer-readable medium, comprising:
    an application programming interface (API) for modular network transaction processing;
    wherein the API defines a series of interfaces to support a series of plug-in processing modules, each interface corresponding to one of the series of plug-in processing modules;
    wherein each of the series of plug-in processing modules corresponds to a unique stage of a plurality of stages of processing a transaction and each of the series of plug-in processing modules is one of a plurality of plug-in modules corresponding to the unique one of the stages;
    wherein, of the series of plug-in processing modules,
        one is configured to initialize a transaction,
        one is configured to get a request,
        one is configured to log in and obtain authorization,
        one is configured to generate a response,
        one is configured to send the response, and
        one is configured to terminate the transaction; and
    wherein the API conveys transaction information from a plug-in processing module for a current stage of processing to a plug-in processing module for a subsequent stage of processing.

2. The software program product of claim 1, wherein the series of interfaces correspond to stages of processing of a network transaction.

3. The software program product of claim 2, wherein the stages of processing comprise: initializing a transaction; getting a request; logging in and obtaining authorization; generating a response; sending the response; and terminating the transaction.

4. The software program product of claim 3, wherein the stages of processing further comprise sending an opening statement.

5. The software program product of claim 1, wherein the API is a component of a network transaction processing application.

6. The software program product of claim 5, wherein the network transaction processing application is configured to dynamically establish communication pathways.

7. The software program product of claim 6, wherein the network transaction processing application is configured to establish a plurality of communication pathways, wherein the communication pathways comprise at least a first pathway configured to process transactions according to a first protocol and a second pathway configured to process transactions according to a second protocol which is different from the first protocol.

8. The software program product of claim 7, wherein the different protocols are embodied in different plug-in modules.

9. The software program product of claim 6, wherein the network transaction processing application is configured to establish a plurality of communication pathways, wherein the communication pathways comprise at least a first pathway configured to provide a first functionality and a second pathway configured to provide a second functionality which is different from the first functionality.

10. The software program product of claim 9, wherein the different functionalities are embodied in different plug-in modules.

11. The software program product of claim 1, wherein the API further defines an interface to a plug-in module for initiating a session.

12. The software program product of claim 1, wherein the API further defines an interface to a plug-in module for terminating a session.

13. The software program product of claim 1, wherein the API further defines an interface to a plug-in module for initiating a pathway.

14. The software program product of claim 1, wherein the API further defines an interface to a plug-in module for terminating a pathway.

15. A computer-implemented method for processing network transactions, comprising:

defining a series of interfaces, wherein each interface corresponds to a stage of processing of a network transaction;

providing a series of plug-in processing modules, where each interface corresponds to one of the series of plug-in processing modules; and configuring the series of interfaces and the series of plug-in processing modules such that
  i) each of the series of plug-in processing modules corresponds to a unique stage of a plurality of stages of processing the network transaction;
  ii) each of the series of plug-in processing modules is one of a plurality of plug-in modules corresponding to the unique one of the stages;
  iii) of the series of plug-in processing modules,
    one is configured to initialize a transaction,
    one is configured to get a request,
    one is configured to log in and obtain authorization,
    one is configured to generate a response,
    one is configured to send the response, and
    one is configured to terminate the transaction; and
  iv) transaction information is passed from a plug-in processing module corresponding to a current stage of processing to a plug-in processing module corresponding to a subsequent stage of processing via the corresponding interfaces.

16. The method of claim 15, wherein the series of interfaces correspond to stages of processing of a network transaction.

17. The method of claim 16, wherein the stages of processing comprise: initializing a transaction; getting a request; logging in and obtaining authorization; generating a response; sending the response; and terminating the transaction.

18. The method of claim 17, wherein the stages of processing further comprise sending an opening statement.

19. The method of claim 15, further comprising replacing one or more current plug-in processing modules with corresponding replacement plug-in processing modules.

20. The method of claim 19, wherein the current plug-in processing modules use a first protocol and the replacement plug-in processing modules use a different protocol.

21. The method of claim 19, wherein the current plug-in processing modules provide a first functionality, and the replacement plug-in processing modules provide a different functionality.

22. The method of claim 19, wherein replacing the one or more current plug-in processing modules with the corresponding replacement plug-in processing modules is performed dynamically.

23. A software program product executable by a central processing unit (CPU) of a computer system, the software program product being embodied in a computer-readable medium, comprising:

an application programming interface (API) for modular network transaction processing;

wherein the API defines a series of interfaces, each interface corresponding to a unique plug-in processing module;

wherein each unique plug-in processing module corresponds to a unique stage of processing a network transaction;

wherein, of the series of plug-in processing modules,
  one is configured to initialize a transaction,
  one is configured to get a request,
  one is configured to log in and obtain authorization,
  one is configured to generate a response,
  one is configured to send the response, and
  one is configured to terminate the transaction; and wherein the API conveys transaction information from a plug-in processing module for a current stage of processing to a plug-in processing module for a subsequent stage of processing.

* * * * *